United States Patent
Parandekar et al.

(10) Patent No.: US 8,228,928 B2
(45) Date of Patent: Jul. 24, 2012

(54) SYSTEM AND METHOD FOR PROVIDING SUPPORT FOR MULTIPOINT L2VPN SERVICES IN DEVICES WITHOUT LOCAL BRIDGING

(75) Inventors: Harshavardhan Parandekar, San Jose, CA (US); Ali Sajassi, San Ramon, CA (US); Sanjay Dhar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/620,390

(22) Filed: Nov. 17, 2009

(65) Prior Publication Data

US 2010/0061379 A1 Mar. 11, 2010

Related U.S. Application Data

(63) Continuation of application No. 11/349,451, filed on Feb. 6, 2006, now Pat. No. 7,633,956, which is a continuation of application No. 11/336,565, filed on Jan. 19, 2006, now abandoned.

(51) Int. Cl.
*H04L 12/56* (2006.01)

(52) U.S. Cl. .................. 370/401; 370/395.53; 370/352; 370/392; 370/351; 709/221

(58) Field of Classification Search .................. None
See application file for complete search history.

(56) References Cited

U.S. PATENT DOCUMENTS

| | | | |
|---|---|---|---|
| 6,111,876 A | 8/2000 | Frantz et al. | 370/392 |
| 6,389,030 B1 | 5/2002 | Coden | 370/404 |
| 6,577,642 B1 | 6/2003 | Fijolek et al. | 370/465 |
| 6,693,878 B1* | 2/2004 | Daruwalla et al. | 370/235 |
| 6,781,989 B1 | 8/2004 | Acharya | 370/392 |
| 7,136,374 B1* | 11/2006 | Kompella | 370/352 |
| 7,152,115 B2 | 12/2006 | Ould Brahim et al. | 709/238 |
| 7,197,556 B1 | 3/2007 | Short et al. | 709/224 |
| 7,376,828 B1 | 5/2008 | Voit et al. | 713/153 |
| 2002/0019875 A1 | 2/2002 | Garrett et al. | 709/230 |
| 2003/0016692 A1 | 1/2003 | Thomas et al. | 370/442 |
| 2003/0152075 A1 | 8/2003 | Hawthorne et al. | 370/389 |
| 2004/0037296 A1 | 2/2004 | Kim et al. | 370/395.53 |
| 2004/0066780 A1* | 4/2004 | Shankar et al. | 370/389 |
| 2004/0081172 A1 | 4/2004 | Ould-Brahim | 370/395.53 |
| 2005/0138149 A1* | 6/2005 | Bhatia | 709/220 |
| 2005/0144327 A1* | 6/2005 | Rabie et al. | 709/249 |
| 2005/0220148 A1 | 10/2005 | DelRegno et al. | 370/498 |
| 2005/0226257 A1* | 10/2005 | Mirzabegian et al. | 370/401 |
| 2005/0265329 A1 | 12/2005 | Havala | |
| 2006/0047851 A1 | 3/2006 | Voit et al. | 709/239 |
| 2006/0120369 A1 | 6/2006 | Chandran et al. | 370/390 |
| 2006/0126643 A1 | 6/2006 | Satou et al. | 370/395.53 |
| 2006/0209836 A1 | 9/2006 | Ke | |
| 2006/0248196 A1 | 11/2006 | Iszlai et al. | 709/227 |

(Continued)

*Primary Examiner* — Huy D Vu
*Assistant Examiner* — Zewdu A Beyen
(74) *Attorney, Agent, or Firm* — Stolowitz Ford Cowger LLP (57) ABSTRACT

A network device has a network interface to allow the device to send and receive traffic across a network. The device also has a cable connection to allow the device to exchange data with at least one cable modem and a processor to associate a cable interface and cable service identifier with a cable modem; receive a packet from the cable modem; and insert a layer 2 network identifier, the identifier comprising two service provider VLAN (SP-VLAN) tags, into the packet. The processor in the network device identifies a virtual trunk interface based on the outer SP-VLAN tag and identifies the virtual private network based on the inner SP-VLAN tag.

20 Claims, 6 Drawing Sheets

U.S. PATENT DOCUMENTS

| | | | |
|---|---|---|---|
| 2006/0248227 A1 | 11/2006 | Hato et al. | 709/245 |
| 2006/0251109 A1 | 11/2006 | Muller et al. | 370/463 |
| 2007/0110028 A1 | 5/2007 | Wu | 370/352 |
| 2007/0115962 A1 | 5/2007 | Mammoliti et al. | 370/389 |
| 2008/0155094 A1 | 6/2008 | Roese et al. | 709/224 |
| 2008/0240113 A1 | 10/2008 | Arad et al. | 370/395.53 |

* cited by examiner

SYSTEM AND METHOD FOR PROVIDING SUPPORT FOR MULTIPOINT L2VPN SERVICES IN DEVICES WITHOUT LOCAL BRIDGING

CROSS REFERENCE TO RELATED APPLICATIONS

This application is a continuation of U.S. patent application Ser. No. 11/349,451, which is a continuation of U.S. patent application Ser. No. 11/336,565, filed Jan. 19, 2006, now abandoned, the contents of which is herein incorporated by reference in its entirety.

BACKGROUND OF THE INVENTION

1. Field of the Invention

The invention relates generally to virtual private networks and, more particularly, to a system and method for providing support for multipoint layer 2 virtual private network services in devices without local bridging capabilities.

2. Description of the Related Art

A Virtual Private Network (VPN) allows service providers to connect multiple customer sites securely over a common shared network. Multipoint layer 2 VPN (L2VPN) service, better known as Virtual Private LAN Service (VPLS), is an important commercial service offered by service providers such as Cable Multiple Service Operators (MSOs) and telephone companies (Telcos) to their business customers. L2VPN service allows business customers to connect networks at geographically dispersed sites or campuses at layer 2 such that these geographically dispersed sites appear to be connected by a single local area network (LAN) segment. The term "layer 2" refers to the second layer in the protocol stack defined by the well-known Open Systems Interconnection (OSI) Reference model, also known as the logical link, data link, or MAC, layer.

Figure 1:
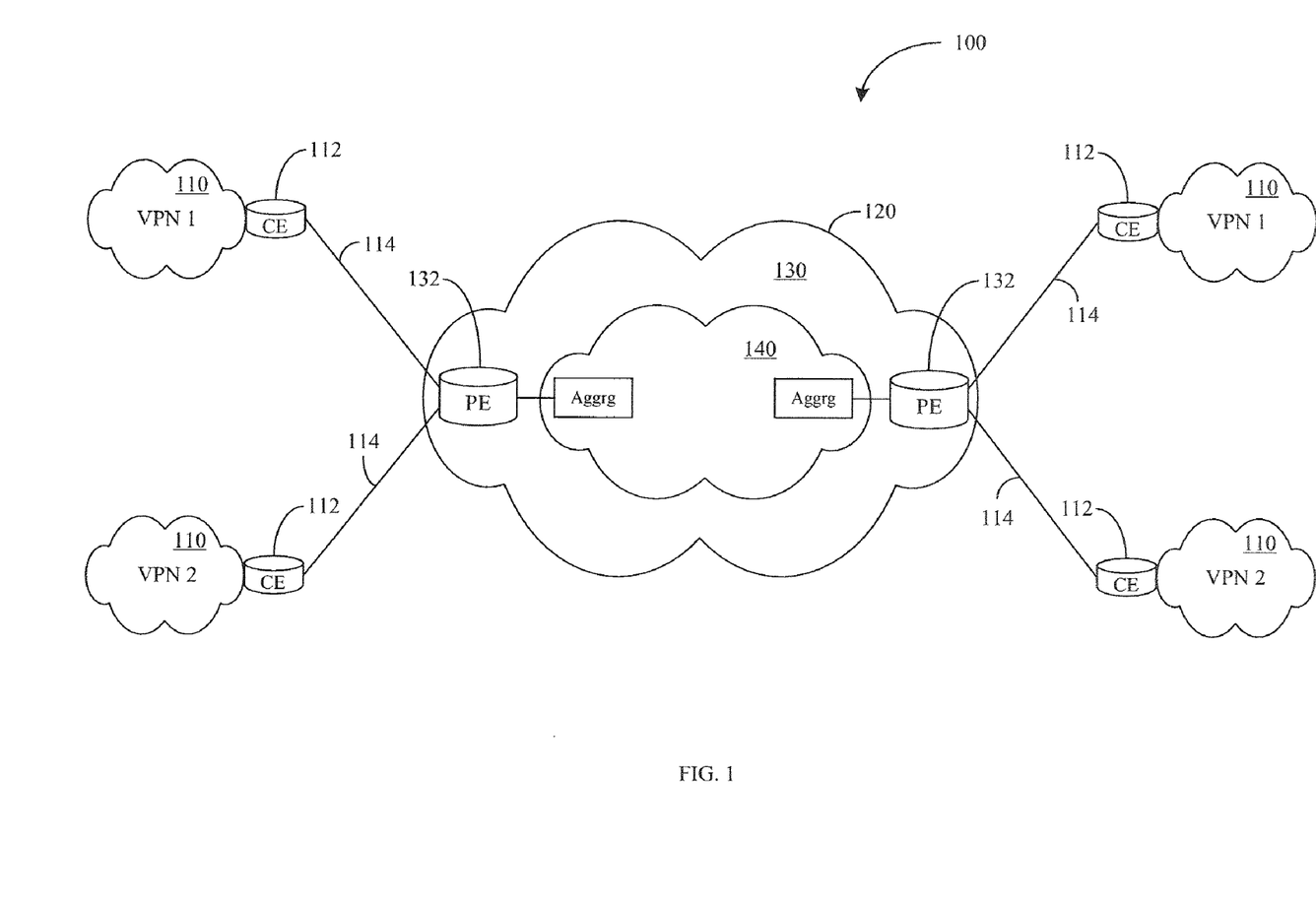
FIG. 1 is a diagram of a basic VPLS.

FIG. 1 shows a basic diagram for VPLS 100. The customer sites 110 are connected to a service provider network 120, which appears as an L2 switch capable of learning and aging. The service provider network 120 can be divided into network segments, the access 130 (i.e., the provider edge) and core 140 networks. Customer edge (CE) devices 112 are those devices with the functionality needed on the customer premises to access the VPN services. Provider edge (PE) devices 132 are those devices at the edge of the service provider network 120 (i.e., at the access network 130) with the functionality needed to interface with the customer. The CE and PE devices include routers and switches. In a VPN environment, the CE devices 112 connect to the PE devices 132 over attachment circuits 114. IEEE 802.1Q defines a standard virtual LAN (VLAN) tagging scheme (Q-tagging) where a "tag" field 210 is added to Ethernet frames to indicate in which VLAN they are supposed to go. This scheme allows an Ethernet port to participate in multiple VLANs.

Figure 2:
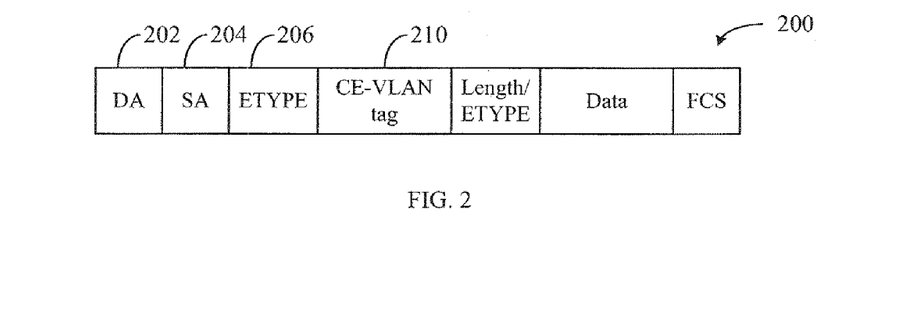
FIG. 2 shows an 802.1Q tagged packet.

FIG. 2 shows an 802.1Q tagged packet 200. The depicted packet 200 includes: a media access control (MAC) destination address (DA) field 202; a MAC source address (SA) field 204; ether type field (ETYPE) 206; the customer edge VLAN (CE-VLAN) tag field 210; and other fields.

Figure 3:
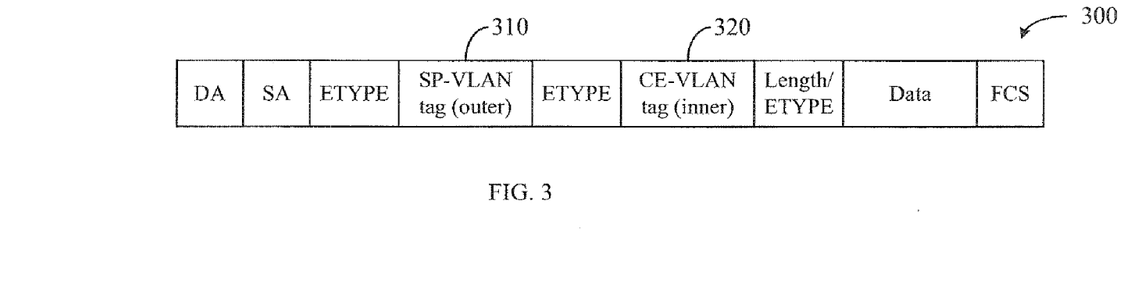
FIG. 3 shows an 802.1ad (Q-in-Q) tagged packet.

One technology that is increasingly used to interconnect devices in a layer 2 service provider network is 802.1ad. IEEE 802.1ad (Provider Bridges), which is nearing completion in the IEEE, builds on IEEE 802.1Q to enable stacked VLANs, commonly referred to as "Q-in-Q" tag stacking. IEEE 802.1ad codifies the use of a service provider VLAN tag visible and managed by the service provider in a manner that does not interfere with the client VLAN structure. FIG. 3 shows an 802.1ad (Q-in-Q) tagged packet 300. The packet format shown in FIG. 3 is similar to the packet format shown in FIG. 2. However, the packet format in FIG. 3 includes a service provider VLAN (SP-VLAN) tag 310 in addition to the customer CE-VLAN tag 320. This Q-in-Q tag stacking mechanism, where the outer tag 310 is managed by the service provider and the inner tag 320 belongs to the business customer, allows not only customer separation but differentiated treatment of customer traffic through the service provider cloud. With Q-in-Q tag stacking, the service provider ingress device (the PE) appends the second VLAN tag 310 in every frame header, which is later removed by the egress device. Each network segment, the access and the core, of the service provider network can add/remove its own tag independently. Traditionally, devices within each network segment only deals with a single tag—the tag that happens to be the outermost tag for that segment. Thus, when a packet crosses the boundary from one network segment to another, either the outermost tag gets disposed or a new tag gets added.

BRIEF DESCRIPTION OF THE DRAWINGS

The above and other features and advantages of embodiments of the invention will become readily apparent by reference to the following detailed description when considered in conjunction with the accompanying drawings.

DETAILED DESCRIPTION OF THE EMBODIMENTS

The invention will be described below with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Multipoint L2VPN service or VPLS is a bridged LAN service. That is, in order to support the VPLS function, the provider edge (PE) devices need to implement a bridging transport mechanism for traffic between remote sites belonging to a customer. Thus, to provide multipoint service in an 802.1ad access network, the PE devices are expected to support local switching (e.g., bridging) functionality.

Figure 4:
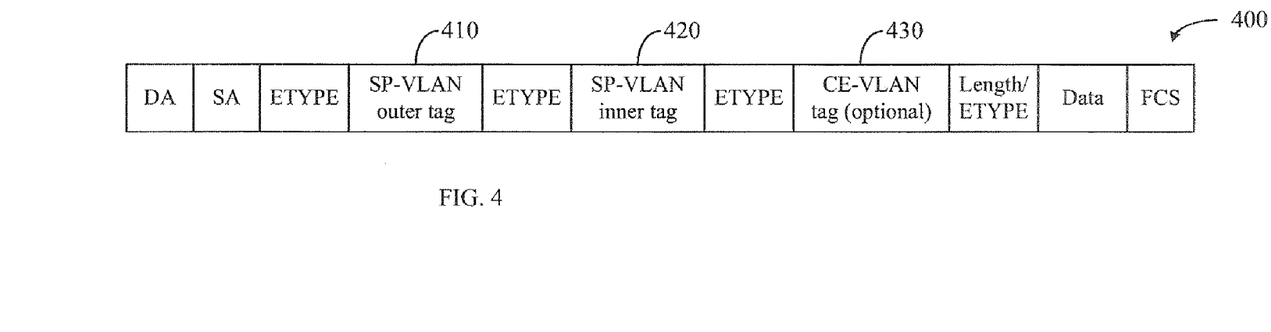
FIG. 4 shows a packet having two service provider VLAN tags and an optional customer edge VLAN tag.

To provide support for multipoint L2VPN services in devices without local switching capability, embodiments of the invention includes a PE device that uses an 802.1ad frame format and off loads the bridging function to an upstream switch. But rather than inserting a single service provider tag as in an ordinary 802.1ad network, the PE device adds two service provider tags for use inside the service provider network. FIG. 4 shows a packet 400 having two SP-VLAN tags 410, 420 and an optional CE-VLAN tag 430. The upstream switch then uses the two SP-VLAN tags 410, 420 to bridge the double SP-VLAN tagged packet 400 across the network.

Data Over Cable Service Interface Specification (DOCSIS) is the current guiding specification for data over cable modem networks with which most cable equipment and network providers comply. In DOCSIS networks, a Cable Modem Termination System (CMTS), located at the cable television system headend or distribution hub, functions as the PE device and provides functionality to cable modems (CMs) to enable connectivity to a wide-area network. Customer traffic is received from a CMTS (the ingress CMTS) or sent to a CMTS (the egress CMTS) in each service provider access network.

Figure 5:
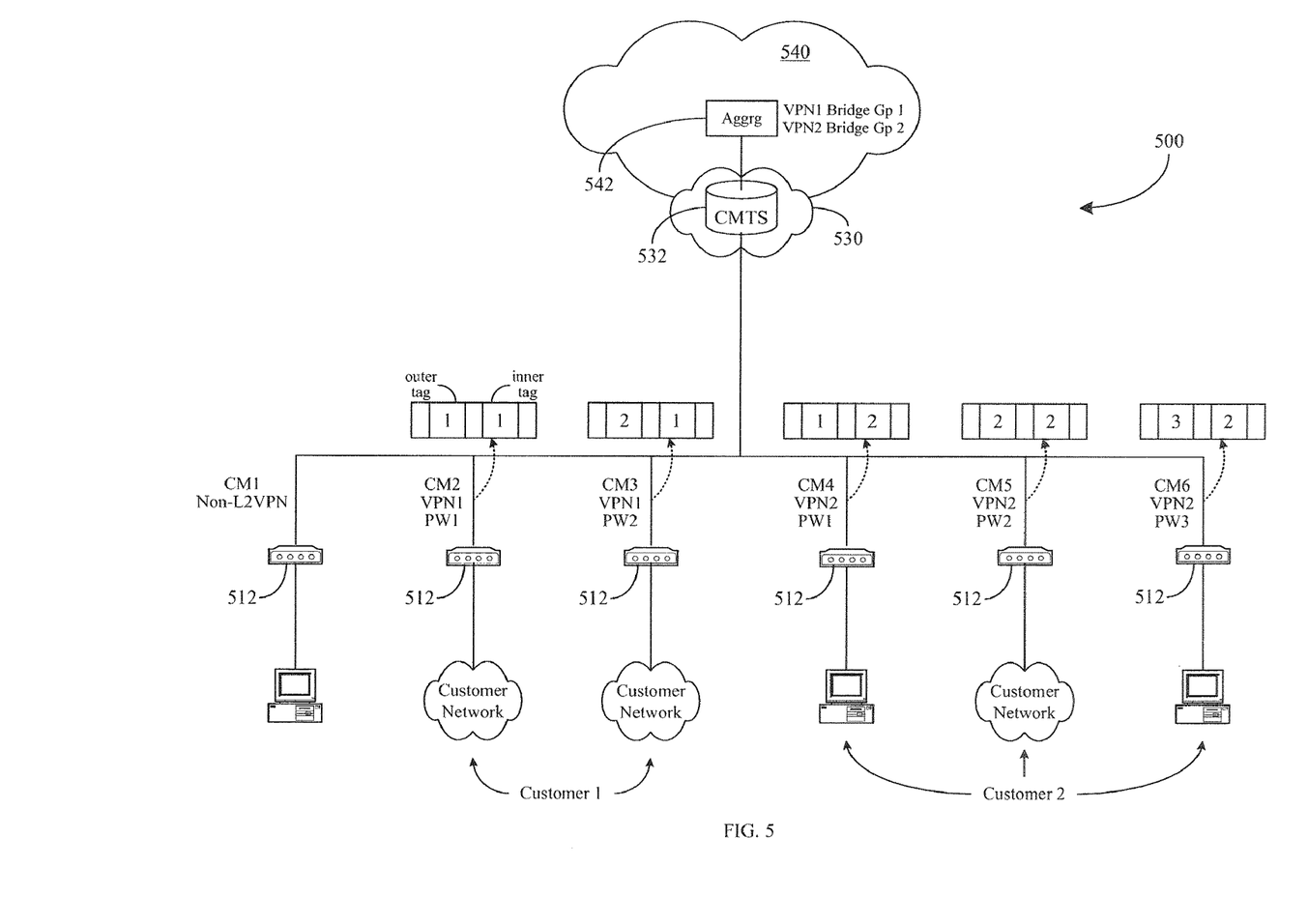
FIG. 5 is a schematic diagram depicting a DOCSIS network for providing L2VPN service.

FIG. 5 is a schematic diagram depicting a DOCSIS network for providing L2VPN service. The example architecture shown is used for ease of discussion and is not intended to limit the scope of the invention. The CMTS functions as the PE device in an L2VPN by connecting the CMs, the customer edge (CE) devices, via attachment circuits to the service provider 802.1ad access network. The DOCSIS protocol uses the concept of service flows for traffic transmitted between the CM and CMTS devices. A service flow is a unidirectional flow of packets that provides a particular quality of service (QoS). Traffic is classified into a service flow, and each service flow has its own set of QoS parameters. The attachment circuits can either be a pair of upstream and downstream service flows or a set of service flows associated with a CM. In the latter case, a specific service flow in the attachment circuit is picked up for transmission based on standard DOCSIS classification.

As shown in FIG. 5, the CMTS 532 in the 802.1ad access network 530 is connected to six CMs 512 at a single cable interface. CM1 is a non-L2VPN device. CM2 and CM3, which belong to the same customer VPN (VPN1), are given separate pseudowires, PW1 and PW2, respectively. A pseudowire is an emulated point-to-point connection over a packet switched network that allows the interconnection of two nodes with any layer 2 technology. CM4, CM5, and CM6, which belong to another customer VPN (VPN2), are also given separate pseudowires, PW3, PW4, and PW5, respectively.

The CMTS 532 may not support local switching; instead, the CMTS may only support point-to-point tunneling of packets between a CM/service flow and a Q-in-Q tag (two VLAN tags). Such a CMTS receives layer 2 protocol data units (PDUs) from a CM or the upstream service flow, inserts the associated Q-in-Q tag, and transmits the packet on its network side interface (NSI). The NSI is the interface through which the device routes the traffic to the network or receives the network traffic. When the egress CMTS receives a Q-in-Q packet from the NSI, it removes the two VLAN tags and transmit the packets on the cable downstream using the associated CM/service flow. Data transfers from the CMTS to the CM are referred to as downstream, while transfers from the CM to the CMTS are referred to as upstream.

For point-to-point L2VPN service, the CMTS 532 in the 802.1ad access network 530 uses two SP-VLAN tags for each service flow. The first SP-VLAN tag (inner tag) identifies the CM/service flow on the destination node and the second SP-VLAN tag (outer tag) identifies the destination node. The upstream 802.1ad aggregation node (e.g., switch) 542 receives packets sent by the CMTS and switches the received packets based on the SP-VLAN outer tag alone. Since the outer tag represents a single fixed destination CMTS, this results only in a point-to-point connection between two CMTSes and, thus, precludes multipoint service.

To provide multipoint L2VPN service in a CMTS not having local switching capability, the CMTS 532 inserts two SP-VLAN tags as in the point-to-point service. However, for multipoint service, these two SP-VLAN tags are interpreted differently by the upstream 802.1ad aggregation switch 542: the SP-VLAN inner tag represents the customer VPN and the SP-VLAN outer tag identifies a single attachment circuit on the CMTS in that customer VPN. Thus, CM2 and CM3 may be assigned the same SP-VLAN inner tag representing VPN 1 and different SP-VLAN outer tags identifying each pseudowire. For example, CM2 may be assigned inner tag=1 (representing VPN1) and outer tag=1 (representing PW1); while CM3 may be assigned inner tag=1 (representing VPN1) and outer tag=2 (representing PW2). Similarly, CM4, CM5, and CM6 may be assigned the same SP-VLAN inner tag representing VPN2. For example, CM4, CM5, and CM6 may be assigned inner tag=2. Since the inner tags for the CMs in VPN1 and VPN2 are different, the outer tags for the CMs need not be unique. For example, CM4 may be assigned outer tag=1 (representing PW1); CM5 may be assigned outer tag=2 (representing PW2); and CM6 may be assigned outer tag=3 (representing PW3).

After the packets entering the 802.1ad access network 530 are tagged by the CMTS 532, the double SP-VLAN tagged packets are forwarded to the aggregation node 542 in the service provider core network 540. For each packet, the aggregation node 542 uses the SP-VLAN outer tag to assign the virtual trunk interface and the SP-VLAN inner tag to assign it to a particular bridge group. Each VPN is a separate bridging group. For example, VPN1 may be assigned to Bridge Group 1 and VPN2 to Bridge Group 2. The aggregation node 542 then bridges the packets accordingly.

Figure 6:
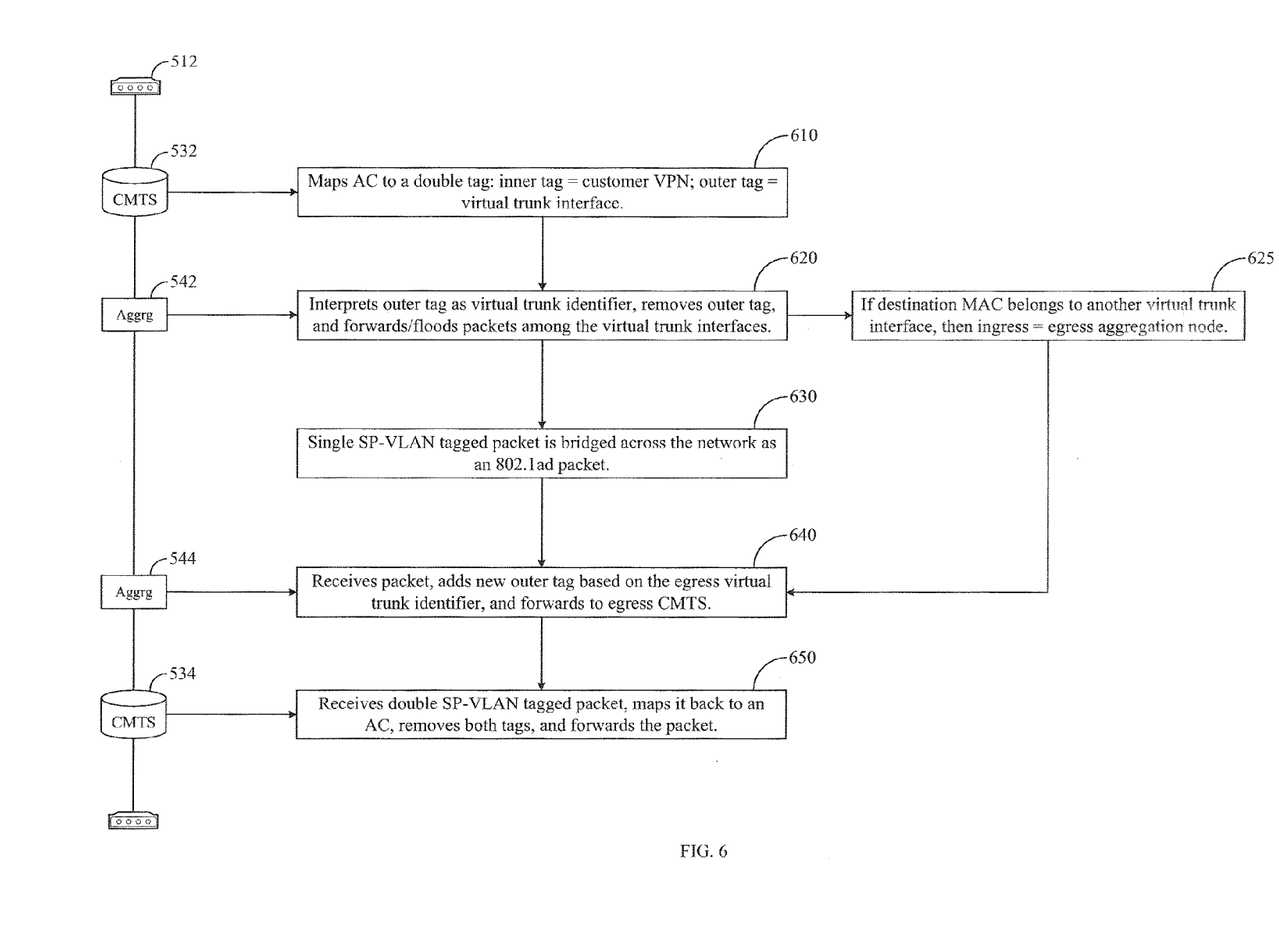
FIG. 6 is a flowchart of a method for providing multipoint L2VPN service in an 802.1ad access network using a CMTS.
Figure 7:
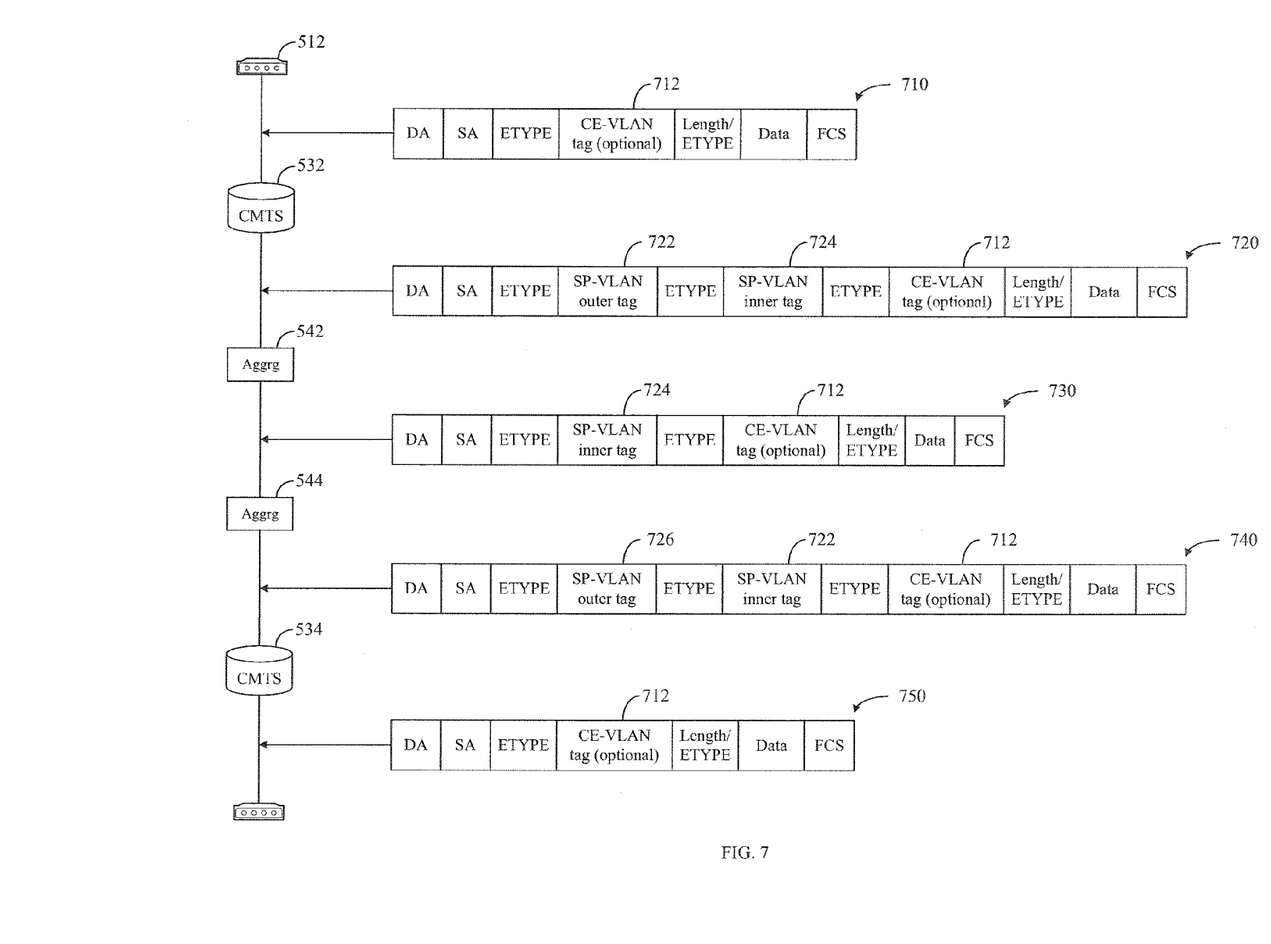
FIG. 7 is a packet flow diagram that shows how a packet traverses the service provider network using the method of FIG. 6.

An embodiment of a method for providing multipoint L2VPN service using the CMTS 532 in an 802.1ad access network 530 is shown in flowchart form in FIG. 6. FIG. 7 is a packet flow diagram that shows how a packet traverses the service provider network using the method of FIG. 6. Refer to FIGS. 6 and 7 in the discussion below.

In step 610, the ingress CMTS 532 maps an attachment circuit to a double SP-VLAN tag, where the SP-VLAN inner tag represents the broadcast domain (i e , a customer VPN) and the SP-VLAN outer tag uniquely identifies a single attachment circuit on the CMTS in that customer VPN. Customers may have their own internal number schemes for their own local 802.1Q VLANs. If a packet 710 arrives with a CE-VLAN tag 712, the ingress CMTS 532 does not strip the received CE-VLAN tag 712 from the header, but instead adds two SP-VLAN tags 722, 724.

The ingress interface upstream aggregation node 542 is configured with a number of virtual trunk interfaces, which is equal to the maximum number of attachment circuits that a CMTS can associate per interface for any customer VPN. In step 620, when the 802.1ad packet 720 is received on a physical interface of the upstream aggregation switch 542, the upstream aggregation switch 542 interprets the SP-VLAN outer tag 722 as a virtual trunk interface identifier (e.g., as a sub-interface) and removes the SP-VLAN outer tag 722. The upstream aggregation switch 542 then builds an L2 Forwarding Database based on the MAC addresses and inner SP-VLAN tag it learns from each virtual trunk interface and forwards/floods the packets among those virtual trunk interfaces (e.g., sub-interfaces). The upstream aggregation switch 542 uses the remaining SP-VLAN inner tag 724 to select the bridge filtering database, which is used to store membership information for the VPNs, to determine where the data is to be sent. In step 625, if the destination MAC is determined to belong to another virtual trunk interface, then the current node is also the egress aggregation node 544.

In step 630, the single SP-VLAN tagged packet 730 is bridged across the network as an 802.1ad packet and received by the egress aggregation node 544.

In step 640, when the packet 730 is received by the egress aggregation node 544, the egress aggregation node 544 adds a new SP-VLAN outer tag 726 based on the egress virtual trunk interface identifier and forwards the packet 740 to the egress CMTS 534.

In step 650, the double tagged packet 740 arrives at the egress CMTS 534. The egress CMTS 534 maps the packet 740 back to an attachment circuit, removes both SP-VLAN tags, and forwards the packet 750.

The mapping in the CMTS from the CM/Service flow attachment circuit belonging to a CM to the SP-VLAN outer tag on the upstream (step 610 of FIG. 6) and the reverse mapping on the downstream (step 650 of FIG. 6) can be done in several ways. An embodiment of a method of the mapping in the CMTS is shown in flowchart form in FIG. 8.

Figure 8:
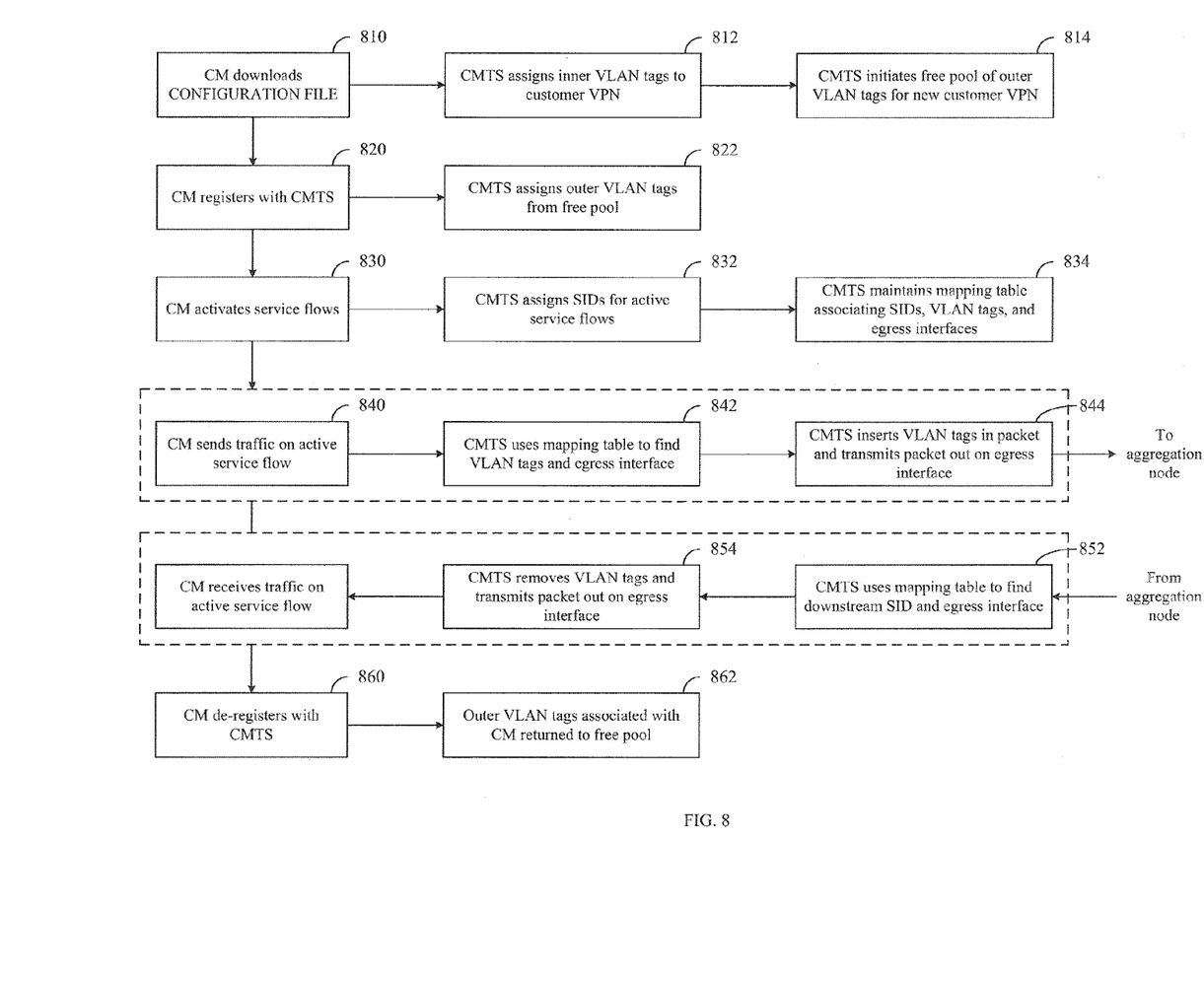
FIG. 8 is a flowchart of a method of the mapping in the CMTS from the CM/Service flow attachment circuit belonging to a CM to the SP-VLAN outer tag on the upstream (step 1 of FIG. 6) and the reverse mapping on the downstream (step 5 of FIG. 6).

In step 810, a CM downloads a configuration file from the provisioning system which it uses to register with the CMTS. The configuration file may contain information that the CMTS can use to associate the CM/service flow with a particular customer VPN and SP-VLAN inner tag in step 812. When the CMTS discovers a new customer VPN in any configuration file, it initiates a free pool of SP-VLAN outer tags for that particular VPN in step 814. The size of the free pool of SP-VLAN outer tags depends on the maximum number of attachment circuits for any VPN at the CMTS. For example, if the maximum number of attachment circuits can be 12, then the CMTS initializes the free pool with SP-VLAN tags from 1 to 12. When the CM registers in step 820, the CMTS then chooses SP-VLAN outer tags for that particular customer VPN from the free pool of tags in step 822.

DOCSIS specifies that a service flow must be activated (step 830) before the CM can send traffic on that service flow. That is, a service flow is said to be "active" when it is permitted to forward data packets. A service flow must first be admitted before it is active. A service flow is said to be "admitted" when the CMTS has reserved resources (e.g., bandwidth) for it on the DOCSIS network. For all active service flows on the CM, the CMTS assigns Service Identifiers (SID) in step 832. The SID is available to the CMTS whenever it receives an upstream packet from the CM. In step 834, the CMTS can maintain a mapping table in the upstream data path to find the SP-VLAN outer and inner tags and the egress interface to the upstream aggregation node associated with the SID. When the CM sends traffic upstream (step 840), the CMTS then uses this information (step 842) to insert the two SP-VLAN tags in the packet and transmit it out on the egress interface (step 844) up to its upstream aggregation node.

On the downstream path, when a CMTS receives a double SP-VLAN tagged packet from its downstream aggregation node, the CMTS can use another lookup mapping table (step 852) to find the downstream SID and egress cable interface that it uses to transmit the packet out after disposing the two SP-VLAN tags (step 854).

When the CM goes offline (i.e., deregisters from the CMTS) in step 860, the SP-VLAN outer tags that may be associated with the CM are returned to the per customer VPN free pool maintained in the CMTS in step 862.

In the system and method for providing multipoint L2VPN services described above, the number of SP-VLAN outer tags is dictated by the maximum number of service flows belonging to a given customer. For example, if 1000 customer VPNs are supported by a CMTS and each has between 3 to 12 service flows, then the number of SP-VLAN inner tags required is 1000 and the number of SP-VLAN outer tags required is 12. Using this technique, over 4000 L2VPN service instances can be supported between one PE and the upstream 802.1ad aggregation device. Therefore, each of these L2VPNs can have over 4000 attachment circuits at the CMTS.

Having described exemplary embodiments of the invention, it is noted that modifications and variations can be made by persons skilled in the art in light of the above teachings. Therefore, it is to be understood that changes may be made to embodiments of the invention disclosed that are nevertheless still within the scope and the spirit of the invention as defined by the appended claims.

What is claimed is:

1. A method comprising:
    receiving a packet from a cable modem;
    identifying a cable interface and cable service identifier associated with the cable modem;
    inserting a layer 2 (L2) network identifier into the packet, the L2 network identifier comprising inner and outer Service Provider Virtual Local Area Network (SP-VLAN) tags to be used within a service provider network to bridge the packet across the service provider network, wherein the inner SP-VLAN tag represents a customer VPN in a multipoint L2VPN service wherein the inner SP-VLAN tag is associated with a particular bridge group, wherein the outer SP-VLAN tag represents a single attachment circuit and wherein the outer SP-VLAN tag is associated with a virtual interface trunk;
    wherein the inner SP-VLAN tag and the outer SP-VLAN tag are added to the packet upon entry into the service provider network;
    and
    transmitting the double SP-VLAN tagged packet to an upstream network device;
    wherein the inner SP-VLAN tag and the outer SP-VLAN tag are removed from the packet prior to exiting the service provider network.

2. The method of claim 1, further comprising:
    wherein a number inner SP-VLAN tags is based on a number of upstream network devices in the VPN; and
    wherein a number of outer SP-VLAN tags is based on a number of service flows available to the customer nodes of the VPN.

3. The method of claim 1 further comprising:
    forwarding and routing the SP-VLAN tagged packet;
    identifying a virtual trunk interface based on the outer SP-VLAN tag, wherein the virtual trunk interface is associated with the cable service identifier;
    removing the outer SP-VLAN tag to form a single SP-VLAN tagged packet; and
    forwarding the single SP-VLAN tagged packet to a downstream network device based on the inner SP-VLAN tag.

4. The method of claim 3, wherein the upstream and downstream network devices comprise a same device.

5. A system comprising:
    an ingress CMTS configured to map at least one attachment circuit to an outer SP-VLAN tag of a double SP-VLAN tagged packet, wherein an inner SP-VLAN tag represents a broadcast domain and the outer SP-VLAN tag uniquely identifies a single attachment circuit on the ingress CMTS in the broadcast domain;

wherein, if a packet arrives at the ingress CMTS with a customer edge VLAN (CE-VLAN) tag in a header, the ingress CMTS adds the inner and outer SP-VLAN tags without removing the CE-VLAN tag from the header;

wherein the inner SP-VLAN tag represents a customer VPN in a multipoint L2VPN service and is associated with a particular bridge group;

wherein the outer SP-VLAN tag is associated with a virtual interface trunk;

wherein the inner SP-VLAN tag and the outer SP-VLAN tag are added to the packet upon entry into a service provider network and wherein the inner SP-VLAN tag and the outer SP-VLAN tag are removed from the packet prior to exiting the service provider network.

6. The system of claim 5, wherein the broadcast domain is a customer VPN.

7. The system of claim 5, further comprising:
an upstream aggregation node comprising a plurality of virtual trunk interfaces, wherein each of the virtual trunk interfaces corresponds to an attachment circuit.

8. The system of claim 7, wherein a number of the plurality of virtual trunk interfaces is equal to a number of attachment circuits the ingress CMTS associates for a particular customer VPN.

9. The system of claim 8, wherein if the packet is received on a physical interface of the upstream aggregation node, then the upstream aggregation node interprets the SP-VLAN outer tag as a virtual trunk interface identifier and removes the SP-VLAN outer tag from the packet.

10. The system of claim 9, wherein the upstream aggregation node is further configure to build a layer 2 (L2) Forwarding Database including a MAC address and SP-VLAN inner tag associated with a virtual trunk interface.

11. The system of claim 10, wherein the upstream aggregation node is further configured to flood the packet to a virtual trunk interface identified.

12. The system of claim 8, wherein the upstream aggregation node is further configured to use the packet comprising the SP-VLAN inner tag without the SP-VLAN outer tag to bridge the packet across a network to an egress aggregation node, wherein the egress aggregation node is configured to add a new SP-VLAN outer tag based on an egress virtual trunk interface identifier.

13. The system of claim 5, comprising an egress aggregation node configure to forward the packet to an egress CMTS.

14. The system of claim 13, wherein the packet includes the SP-VLAN inner tag and a new SP-VLAN outer tag, wherein the egress CMTS is configured to map the packet back to an attachment circuit, remove the SP-VLAN inner tag and the new SP-VLAN outer tag, and forward the packet.

15. A system comprising:
means for accessing a configuration file, wherein the configuration file includes information for associating a cable modem (CM) with a particular customer VPN and an SP-VLAN inner tag, wherein the inner SP-VLAN tag is associated with a bridge group;
means for adding the SP-VLAN inner tag to a packet upon ingress into a service provider network;
means for discovering a customer VPN in the configuration file;
means for selecting and adding an SP-VLAN outer tag corresponding to the customer VPN to the packet from a plurality of available tags, wherein the plurality of available tags is limited to a number of tags associated with corresponding attachment circuits associated with the customer VPN, wherein the outer SP-VLAN tag is associated with a virtual trunk interface;
means for transmitting the packet on an egress interface to an upstream aggregation node; and
means for removing the inner SP-VLAN tag and the outer SP-VLAN tag from the packet prior to exiting the service provider network.

16. The system of claim 15, further comprising means for assigning Service Identifiers (SID) to one or more active service flows corresponding to the CM, wherein the SIDs are available to a CMTS upon receipt of a packet from the CM.

17. The system of claim 16, further comprising means for maintaining an upstream mapping table for mapping the SP-VLAN outer and inner tags and an egress interface to an upstream aggregation node associated with the SID.

18. The system of claim 15, wherein a number of the plurality of available tags corresponds to a maximum number of attachment circuits for any VPN at a CMTS.

19. The system of claim 16, further comprising means for initiating a plurality of free SP-VLAN outer tags corresponding to the customer VPN.

20. The system of claim 15, further comprising:
means for assigning Service Identifiers (SID) to one or more active service flows corresponding to the CM, wherein the SIDs are available to a CMTS upon receipt of a packet from the CM; and
means for maintaining an upstream mapping table for mapping the SP-VLAN outer and inner tags and an egress interface to an upstream aggregation node associated with the SID.

* * * * *